3,368,078
RADIANT ENERGY SENSITIVE DEVICE
Edward F. Flint, Fullerton, and Robert Bruce Horsfall, Placentia, Calif., assignors to North American Rockwell Corporation, a corporation of Delaware
Filed Oct. 2, 1964, Ser. No. 402,063
14 Claims. (Cl. 250—216)

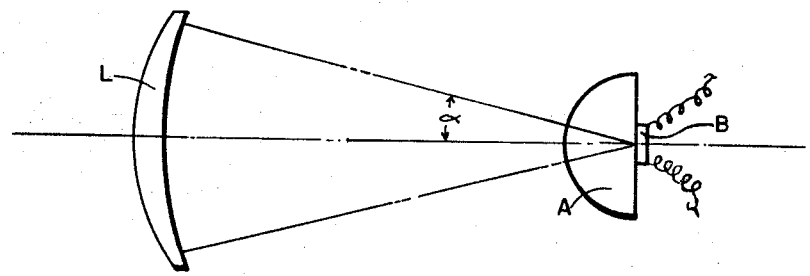
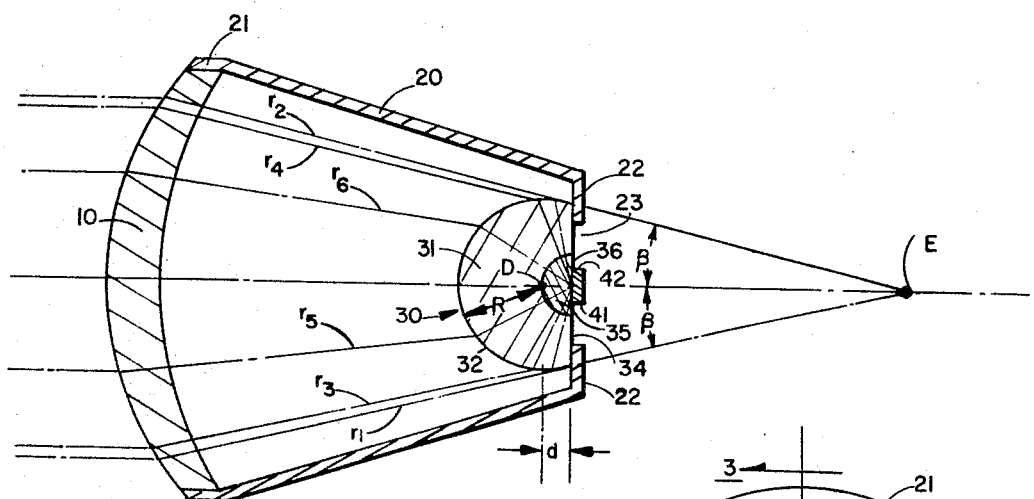
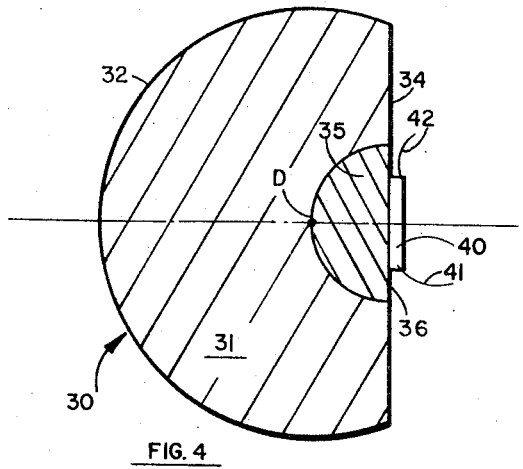
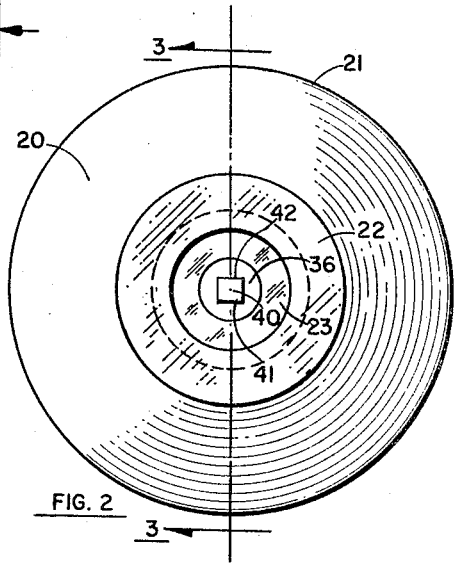
INVENTOR.
EDWARD F. FLINT
ROBERT BRUCE HORSFALL
ATTORNEY United States Patent Office 3,368,078
Patented Feb. 6, 1968

ABSTRACT OF THE DISCLOSURE

A radiant energy sensitive device comprising an aplanat having a hyperhemispherical surface and a hemispherical surface, and a lens, the front surface of which is hemispherical and in optical contact with the hemispherical surface of the aplanat, the back surface of the lens being substantially flat. The index of refraction of the lens is less than the index of refraction of the first lens. A radiant energy detector is placed in optical contact with the flat surface of the lens.

---

This invention relates to a radiant energy detector, and, more particularly, to such a detector utilizing an aplanat.

In general, an aplanat is any lens or lens system designed to focus light of at least one wavelength from one specific point to a second (conjugate) point with substantially zero spherical aberration and coma. The specific form of aplanat utilized in this invention is one in which a radiation sensitive element is optically attached to the lens by a medium (such as a cement) whose index of refraction is substantially greater than that of air. As is well known in the field of microscopy, a spherical surface of radius R separating two media such that the index of refraction of the medium inside the sphere relative to the medium outside the sphere is $n$, is aplanatic for two points, the first point lying in the denser medium at a distance $R/n$ from the center of the sphere and the second point lying at a distance $R \cdot n$ from the center of the sphere, colinear with the center and the first point. In this form, the light rays actually pass through the first point (it is a real object or image), but only the projections of the rays in the outside (less dense) medium pass through the second point (it is a virtual image or object). In microscopy, the less dense medium is ordinarily air. Use of such an aplanat in this case provides both higher resolving power and brighter illumination of the microscopic object than is possible with air between the object and the lens. An oil is usually used to provide optical attachment between the object slide and the lens, which is ground to a hyperhemispherical form to permit placing the object at the first point.

In the present invention, a similar aplanat is used as a radiant energy detector in the reverse direction, in accordance with the optical reciprocity law, to permit greater concentration of the incident radiation on the sensitive element. In particular, the signal-to-noise ratio ($S/N$) of a photo-resistive type radiant energy sensing element varies inversely with the square root of the detector area. Other factors being equal, the $S/N$ of a radiant energy detector including a lens system will thus vary inversely with the magnification of the lens system from source to sensing element. There are practical limitations on the equality of other factors which are discussed more fully in the detailed description of this invention below.

Accordingly, an object of the invention is to provide a new and improved radiant energy sensing system having a relatively high sensitivity.

Another object of the invention is the provision of a radiant energy detector utilizing an aplanatic lens system so as to minimize many practical limitations.

Still another object of the invention is to provide a relatively compact radiant energy detector which is still highly sensitive.

Other objects of this invention will become apparent from the following description taken in conjunction with the accompanying drawings in which:

FIG. 1 illustrates a prior art detector system utilizing a hemispherical lens;

FIG. 2 illustrates a rear elevation view of an optical system embodying the invention;

FIG. 3 illustrates a cross sectional view on lines 3—3 in FIG. 2; and

FIG. 4 illustrates an enlarged view of the aplanat shown in FIG. 3.

FIG. 1 illustrates a prior art detector system utilizing a hemispherical lens A of refractive index $n$ having a sensing element B secured to the rear planar surface thereof. A relay system is generally employed which in this illustration is identified as L. In this system, hemispherical lens A produces a magnification $1/n$, which in the absence of light loss would improve $S/N$ by a factor $n$. In this prior art, a major application is to infrared radiation, and lens A is made of germanium, whose index of refraction is substantially 4 for the wavelengths of interest (3–13 microns). With optimum anti-reflection coating, the transmission of this lens can be as high as 80 percent, so if the angle $\alpha$ is not too large, this system can give an improvement in $S/N$ of about 3.2 compared to the same system without the hemisphere. However, the best available cement for attaching element B to lens A is a sulfur-free arsenic modified selenium material (hereinafter refered to as AsSe) whose refractive index in the above wavelength range is substantially 2.46. If an attempt is made to increase the angle $\alpha$ to improve $S/N$, the marginal rays impinge at a higher angle of incidence on the germanium, AsSe interface, so a higher percentage is reflected and lost. The limit is reached at substantially $\alpha = 38$ degrees, where the critical angle occurs and the incident light is totally reflected. Note that the cement used for attaching element B to lens A must meet several requirements, whether B be a thermistor (bolometer) or a photoresistive cell of any of the known types. It must (1) be an electrical insulator, (2) have a working temperature low enough to avoid damage to the sensitive element, and (3) be transparent to the desired wavelengths.

The radiant energy detector of the present invention utilizes an aplanat instead of the hemispherical lens of the prior art. As illustrated in FIGS. 3 and 4, this aplanat has the form of a hyperhemisphere, with the flat surface 34 substantially passing through the first aplanatic point at a distance $R/n$ from the center of curvature D of the spherical surface 32. A relay lens 10 is used to direct the incident radiant energy from the center of the radiating object toward the second aplanatic point E. After refraction at the spherical surface, this radiation is directed toward the center of the radiation sensitive element 40, which is attached to the plane surface of the aplanat by a cement layer. For infrared raditaion, element 40 may be a bolometer element such as a thermistor, a photoconductive cell of a material such as cadmium selenide or other device capable of producing an electrical signal in response to incident radiation.

In this configuration, the aplanat produces a magnification of $1/n^2$, and in the absence of light loss would therefore improve $S/N$ by a factor of $n^2$. Provided a cement were available whose refractive index matched that of the aplanat, substantially a complete hemisphere of radiation within the aplanat could be used. For this case, the angle $\beta$ of the limiting rays incident on the aplanat is given by $n \sin \beta = 1$. If the cement has a lower refractive index than the aplanat, total reflection will limit the useful limiting rays within the aplanat to a half cone angle whose sine is the ratio of the cement index to the aplanat index. In this case, the limiting angle $\beta$ is given by $$\text{Sin } \beta = n_c/n_a^2$$

where $n_c$ is the refractive index of the cement and $n_a$ is the refractive index of the aplanat.

In either case, the gain in $S/N$ resulting from use of the aplanat is substantially the same, what difference there is being due to the effects of partial reflections at the air-lens and lens-cement interfaces. For comparison with prior art, assuming a germanium lens and AsSe cement, with the same 80 percent transmission factor as before, the aplanat produces an $S/N$ gain by a factor of 12.8.

However, with existing materials, $\beta$ is limited to 8 degrees 51 minutes for a germanium aplanat. This is a major decrease below the 14 degrees 29 minutes which would be possible if a cement which matched germanium in index were available. Because the $S/N$ of a complete system also depends directly on the area of the relay lens aperture, a longer system is required by the smaller $\beta$. This also increases the overall system magnification and, therefore, counteracts some of the $S/N$ gain resulting from use of the aplanat.

The same configuration may be used with the aplanat made of a material such as polycrystalline zinc selenide whose index of refraction is 2.43. In this case AsSe (as a cement for element 40) is an excellent match, and there is no limitation by total reflection. The angle $\beta$ of the limiting rays is then 24 degrees 18 minutes corresponding to an acceptance cone of 48 degrees 36 minutes; so a shorter relay system is possible for a given aperture. Also, the transmission factor is 90 percent for this material. Thus, the $S/N$ gain for the aplanat is 5.32.

In the configuration in the drawing, a small hemisphere 35 of a lower index material is inserted in the aplanat, concentric with the first aplanatic point. Because the radiation passes substantially normal to the surface of this hemisphere, total reflection is not a problem at this surface. If the cement joining sensitive element 40 to hemisphere 35 matches it in index, the entire hemisphere of radiation is useful. By using a suitable anti-reflection coating on the concave surface of the aplanat before cementing hemisphere 35 in place, the overall transmission can be kept substantially that of the outer element of the aplanat alone.

More specifically, a photosensitive system embodying the present invention may utilize a frustoconical housing 20 having at the large end a cylindrical flange 21 for supporting a relay lens 10. The relay lens 10 is employed to direct the radiation toward the aplanat 30. It will be understood that the lens 10 could be various types of focusing systems such as a doublet or other lens system. It will be chosen to give a satisfactory compromise of transmission and correction of optical aberrations for the particular application. At the small end of housing 20 is a planar ring flange 22 as shown in FIG. 3 defining a circular opening 23. The relay lens 10 shown has a focal point E as shown in FIG. 3. Mounted on the inner side of the ring flange 22 is the aplanat 30. The aplanat 30 comprises an outer portion 31 having a hyperhemispherical surface 32. The planar side of the aplanat is located a distance $d$ which equals $R/n$ from the spherical center D where R is equal to the spherical radius and $n$ is the index of refraction of the material. This is the known condition for aplanatic refraction. The corresponding conjugate point E is at a distance $R \cdot n$ from D. The outer portion 31 is preferably constructed of a material having an index of refraction as high as practicable. A hemispherical recess is employed in the outer hyperhemispherical portion 31 wherein an inner hemispherical section 35 is inserted. This section is centered on the optical axis of section 31 as shown in the drawing. Section 35 may be made of a material of lower refractive index which is secured to section 31 by a suitable cement or by means of optical contact between sections 35 and 31. The flat surface 36 of the hemisphere 35 is co-planar and concentric with the flat surface 34 of the outer hyperhemispherical element 31. Thus, the refracted rays within the aplanat corresponding to the incident pencil converging from relay lens 10 toward point E travel radially in inner portion 35. They are, therefore, incident normally on the interface and do not suffer total reflection or refraction.

If the present invention is to be employed as an infrared photodetector, the outer hyperhemispherical portion 31 may be made of germanium so as to utilize the relatively low cost of germanium and its relatively high index of refraction (4) for infrared rays. The hemispherical section 35 may be made of arsenic modified selenium minus sulphur. The index of refraction of this material is approximately 2.46 for the infrared wave lengths. A photosensitive element 40 is secured to the surface 36 by heating the material of inner portion 35 (arsenic modified selenium minus sulphur) to its softening temperature (approximately 180 degrees Fahrenheit). The element 40 can be any suitable device which is sensitive to the desired infrared rays. An example of a suitable photosensitive element for infrared rays would be a thermistor bolometer or lead selenide photoconductive cell. Element 35 is softened by heating whereupon element 40 is applied to and centered on surface 36. When the temperature is subsequently lowered, a cementing action takes place between element 40 and surface 36 to place sensor 40 in optical contact with hemisphere 35. Hence element 40 is then fastened to the arsenic modified selenium of the hemisphere 35. Hemisphere 35 will act as an electrical insulator between the element 40 and the germanium element 31. The purpose of this is to prevent electrical shorting of the detector 40 by electrical conductivity of the germanium. The energizing of detector 40 requires such insulation. As shown in FIGS. 3 and 4, the element 40 has some suitable output leads 41 and 42 which are connected to other circuitry for readout or utilizing the signal emanating therefrom.

As stated above, the focal point of the relay lens 10 is illustrated as E in the drawing which is also the outer aplanatic point of the hyperhemisphere. The relay lens 10 is so designed that the outer rays $r_1$ and $r_2$ directed by lens 10 are, as shown in FIG. 3, tangential to the aplanat surface 32. Rays coming just slightly inward from the outer rays $r_1$ and $r_2$ (e.g., rays $r_3$ and $r_4$) strike the outer surface 32 and are refracted inwardly toward the sensitive element 40 and into the hemispherical portion 35. As can be seen, the angle at which the rays $r_3$ and $r_4$ strike the surface of the hemispherical portion 35 is substantially normal thereto. Consequently despite a difference in the index of refraction, there will be no refraction of these rays and comparatively little reflection. This is likewise true of any other rays inwardly of rays $r_1$ and $r_2$ and more specifically rays illustrated as $r_5$ and $r_6$ in FIG. 3.

The overall magnification of the modified aplanat is now $$\frac{1}{n_1^2} \cdot \frac{n_1}{n_2} = \frac{1}{n_1 n_2}$$

where $n_1$ is the index of the aplanat and $n_2$ is the index of the hemisphere 35. Thus, the $S/N$ is improved by a factor of $n_1 \cdot n_2$. Assuming germanium for the aplanat and polycrystalline zinc selenide for the hemisphere, and allowing 80 percent as the transmission factor, the gain is 7.78. Also, the limiting value of $\beta$ is now 14 degrees 29 minutes, so a comparatively short relay system is possible. Essentially, the same figures apply for AsSe as the hemispherical element.

If in fact, the relay system could be equally efficient for a $\beta$ angle of 24 degrees 18 minutes as for one of 14 degrees 29 minutes, the $S/N$ factors for the two relay systems would be in the ratio of the sines of the angles, which is also the ratio of the aplanat indices. Then the polycrystalline zinc selenide aplanat would give a slightly better overall system than the one shown in FIGS. 2 and 3. However, practical factors in lens design will normally make the larger $\beta$ angle produce a less efficient relay system. Thus, the selection between the two embodiments must be made on the basis of the particular application contemplated. Other engineering compromises may be made which could give further small improvements in $S/N$ by departing from a strictly aplanatic design, as, for example, by making the low index insert of FIGS. 3 and 4 somewhat flatter than a hemisphere. This would tend to push the "aplanat" gain factor to a value between $n_1$, $n_2$ and $n_1^2$. The effect of such detailed modifications can be readily estimated by one skilled in the art of lens design.

In the embodiment in the drawing, the point D is illustrated on the surface of hemisphere 35. It will be understood that hemisphere 35 could be larger or smaller so that point D would be located within hemisphere 35 or within portion 31.

Although this invention has been described and illustrated in detail, it is to be clearly understood that the same is by way of illustration and example only and is not to be taken by way of limitation, the spirit and scope of this invention being limited only by the terms of the appended claims.

We claim:
1. A radiant energy sensing aplanat having a hyperhemispherical surface and a substantially planar surface, said aplanat including an inner portion and an outer hyperhemispherical portion, said inner portion having a surface co-planar with said planar surface, the index of refraction of said inner portion being less than the index of refraction of said outer portion, a radiant energy detector, and a cement layer connecting said detector to said co-planar surface, said cement and said inner portion having substantially equal indices of refraction.

2. A photosensing aplanat as set forth in claim 1 wherein said cement, said inner portion and said outer portion are capable of transmitting rays from 3 to 13 microns.

3. A photosensing aplanat having a hyperhemispherical surface and a substantially planar surface, said aplanat comprising an inner hemispherical portion having a planar surface substantially co-planar with the planar surface of said aplanat and an outer hyperhemispherical portion, said inner portion being located within said outer hyperhemispherical portion, a radiant energy detector, a cement layer mounting said detector on the planar surface of said inner portion, said cement and said inner portion having substantially equal indices of refraction, said outer portion having an index of refraction which is greater than said equal indices of refraction.

4. A photosensing device as set forth in claim 3 including a relay lens co-axially mounted with respect to said hyperhemispherical portion a predetermined distance therefrom providing infrared rays tangential to said hyperhemispherical surface.

5. A radiant energy sensitive device comprising:
a first lens, the front surface of which is convex and at least a portion of the back surface of which is concave;
a second lens, the front surface of which is convex, the convex surface of said second lens being in optical contact with the concave surface of said first lens, the back surface of said second lens being substantially flat, the index of refraction of said second lens being less than the index of refraction of said first lens; and
a radiant energy detector in optical contact with the flat surface of said second lens.

6. The radiant energy sensitive device of claim 5 wherein said first lens comprises an aplanat, the front surface of which is hyperhemispherical.

7. The radiant energy sensitive device of claim 6 wherein the concave portion of the back surface of said first lens is hemispherical and wherein the remainder of the back surface of said first lens is substantially flat.

8. The radiant energy sensitive device of claim 7 wherein the front surface of said second lens is hemispherical, the hemispherical surfaces of said first and second lenses being in optical contact, and wherein the flat surfaces of said first and second lenses are co-planar.

9. The radiant energy sensitive device of claim 5 wherein the concave portion of the back surface of said first lens is hemispherical and wherein the remainder of the back surface of said first lens is substantially flat.

10. The radiant energy sensitive device of claim 9 wherein the front surface of said second lens is hemispherical, the hemispherical surfaces of said first and second lenses being in optical contact, and wherein the flat surfaces of said first and second lenses are co-planar.

11. The radiant energy sensitive device of claim 5 wherein the front surface of said second lens is hemispherical.

12. The radiant energy sensitive device of claim 5 wherein said second lens is made of a cement material whereby said second lens is operative to connect said second lens to said first lens and said detector to said second lens.

13. The radiant energy sensitive device of claim 5 further comprising:
a cement layer for connecting said radiant energy detector to the flat surface of said second lens, said cement and said second lens having substantially equal indices of refraction.

14. The radiant energy sensitive device of claim 5 wherein said radiant energy detector is sensitive to infrared energy and wherein said first and second lenses are transparent to infrared energy.

References Cited

UNITED STATES PATENTS

| | | | |
|---|---|---|---|
| 2,964,636 | 12/1960 | Cary | 250—211 |
| 2,983,823 | 5/1961 | Oberly | 250—211 |
| 3,002,092 | 9/1961 | Cary | 350—2 X |
| 3,166,623 | 1/1965 | Waidelich | 350—175 |
| 3,239,675 | 3/1966 | Morey et al. | 338—19 X |
| 3,295,913 | 1/1967 | Walther | 350—179 X |

FOREIGN PATENTS 664,754  1/1952  Great Britain.

OTHER REFERENCES

Di Francia, "New Stigmatic System of the Concentric Type," Journal of the Optical Society of America, vol. 47, No. 6, p. 566, June 1957 (350-175 SL).

RALPH G. NILSON, *Primary Examiner.*

ARCHIE R. BORCHELT, *Examiner.*

M. A. LEAVITT, *Assistant Examiner.*